Figure 1:
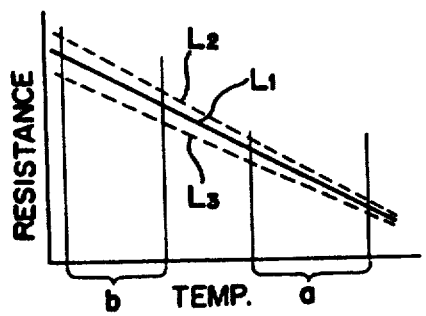

United States Patent

Horinouchi et al.

[11] Patent Number: 4,484,050
[45] Date of Patent: Nov. 20, 1984

[54] ELECTRIC COOKING OVEN HAVING A TEMPERATURE SENSING DEVICE WITH OUTPUT COMPENSATION

[75] Inventors: Atsushi Horinouchi; Satoshi Koide, both of Otsu, Japan

[73] Assignee: Sanyo Electric Co., Ltd., Moriguchi, Japan

[21] Appl. No.: 514,854

[22] Filed: Jul. 18, 1983

Related U.S. Application Data

[63] Continuation of Ser. No. 248,327, Mar. 27, 1981, abandoned.

[30] Foreign Application Priority Data

Mar. 31, 1980 [JP] Japan ................................ 55-42360

[51] Int. Cl.³ .......................... H05B 6/68; G01K 7/24
[52] U.S. Cl. ........................ 219/10.55 B; 219/10.55 E; 219/505; 219/515; 374/149; 374/172; 374/185; 99/325; 340/584
[58] Field of Search ............... 219/10.55 B, 10.55 R, 219/10.55 E, 505, 515; 73/362 AR, 362.4, 362.6; 374/185, 149, 172, 173; 323/366, 369; 99/421 T, 325; 340/588, 589, 584

[56] References Cited

U.S. PATENT DOCUMENTS

| | | | |
|---|---|---|---|
| 3,750,155 | 7/1973 | Oman | 73/362 AR |
| 4,035,787 | 7/1977 | Hornung | 73/362 AR |
| 4,148,220 | 4/1979 | Spofford | 73/362 AR |
| 4,216,675 | 8/1980 | Nagata et al. | 73/362 AR |
| 4,294,116 | 10/1981 | Yamamura et al. | 73/362 AR |
| 4,314,143 | 2/1982 | Bilstad et al. | 219/505 X |

FOREIGN PATENT DOCUMENTS 2036378 6/1980 United Kingdom ......... 219/10.55 B

OTHER PUBLICATIONS

Toshiba, ad brochure, Toshiba ER-798BT, The Touch Control Programmable MW Oven, 11-79.

Primary Examiner—P. H. Leung
Attorney, Agent, or Firm—Armstrong, Nikaido, Marmelstein & Kubovcik

[57] ABSTRACT

An electric cooking oven for use a normal cooking mode and defrost mode is provided which comprises a detector for detecting a temperature of a food body during cooking thereof, the detector comprising a thermistor which detachably attached to the food body to sense the temperature thereof. A circuit is provided for compensating the gradient of the output characteristics of the temperature detector to increase the gradient of the output characteristic curve of the resistance of the thermistor as a function of temperature in when the thermistor is operating in a temperature range in which it has a low accuracy of temperature sensing.

12 Claims, 5 Drawing Figures

ELECTRIC COOKING OVEN HAVING A TEMPERATURE SENSING DEVICE WITH OUTPUT COMPENSATION

This application is a continuation of application Ser. No. 248,327, filed Mar. 27, 1981, now abandoned.

The present invention relates to an electric cooking oven wherein a temperature sensing device including a thermistor is provided for detecting the temperature of the food body so as to cook the food body under the temperature control.

A microwave oven having a function of defrosting the food body to be cooked is known by, for example, U.S. Pat. No. 4,190,756. On the other hand, it is also known that a temperature sensing device including one or more thermistors are employed in the microwave oven for sensing the temperature of the food body to be cooked so as to operate the oven under the temperature control, for example, by U.S. Pat. No. 4,149,056.

In a microwave oven having such a defrost mode and the temperature of the food body to be cooked is controlled on the basis of the signal of the thermistor, there are such drawbacks that the temperature of the food body is sensed with a lower accuracy in the defrost mode than accuracy in the normal cooking mode which is performed with higher temperature.

Conventionally, thermistors are manufactured to operate with highest accuracy within the sensing ranges with which the thermistors are normally used. In other words, a thermistor manufactured to operate with high accuracy in the high temperature range for example in around 100° C. would operate with low accuracy in the lower temperature range such as around 0° C. For example, a thermistor for use in a microwave oven is manufactured to operate with the highest accuracy within the temperature range of around 100° C. and the accuracy thereof becomes lower as the sensing temperature becomes lower.

FIG. 1 shows an example of a temperature dependence characteristic curves of the resistance value Rth of a thermistor having the highest accuracy around 100° C. In FIG. 1 the respective areas a and b represent the temperature ranges of 0° C. and 100° C. The real line L1 shows an ideal temperature dependence characteristics with the dotted lines L2 and L3 showing the respective error ranges for corresponding temperature. The characteristic curves in FIG. 1 show that errors occurring in the area b are larger than those occurring in the area a. Therefore, a conventional thermistor which is designed and manufactured for use in a microwave oven generally in a high temperature range represents relatively large errors in measurement in the low temperature range, so that a microwave oven employing such a thermistor for temperature control of the food body without compensation of the temperature characteristics of the thermistor can not operate at a range of around 0° C. in the defrost mode cooking.

In order to solve that problem, one proposed method is to provide an additional thermistor which is designed to operate with high accuracy within around 0° C. However, the proposed method apparently causes a cooking operation of the oven troublesome, since the two thermistors must be replaced depending on which mode i.e., normal cooking mode or defrost mode is performed in that oven.

Another proposed method is to use on thermistor having a high accuracy in temperature sensing characteristics overall the cooking temperature i.e., from 0° C. to 100° C. However, such a thermistor is expensive, so that it is not suitable to use in the oven for home use.

The present invention is made to eliminate such drawbacks being inherent in the conventional electric cooking oven and an essential object of the present invention is to provide an electric cooking oven which enables to cook the food body under an accurate temperature control in either the defrost mode and the normal cooking mode with a temperature sensing probe comprising only one single conventional inexpensive thermistor.

The other object of the present invention is to provide an electric cooking oven having an electric circuit arrangement which is operated in association with a thermistor to compensate errors occurring outside the predetermined temperature range in which said thermistor senses the temperature with high accuracy.

These and other features of the electric cooking oven according to the present invention will be fully described in conjunction with a preferred embodiment with reference to the attached drawings in which;

FIG. 1 is a schematic diagram showing characteristic curves of a thermistor designed to operate with a high accuracy around 100° C. taking both axes for a sensing temperature and resistance.

Figure 3:
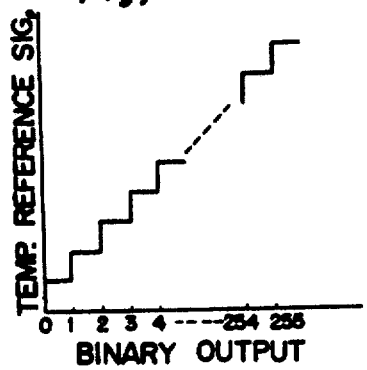
Figure 4:
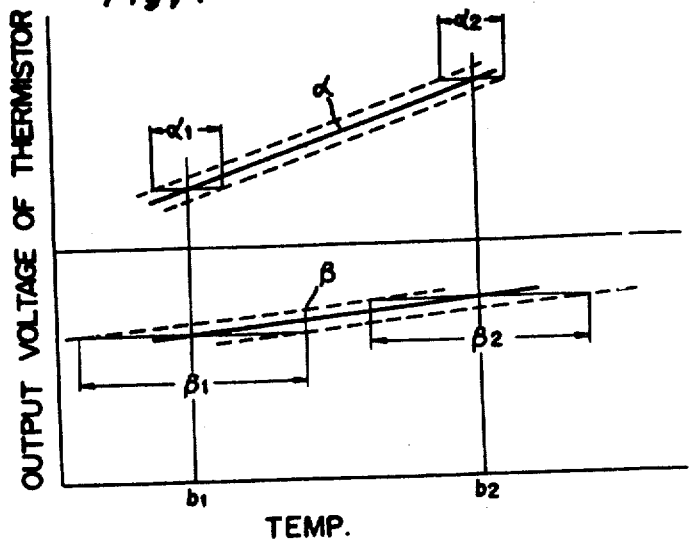
Figure 2:
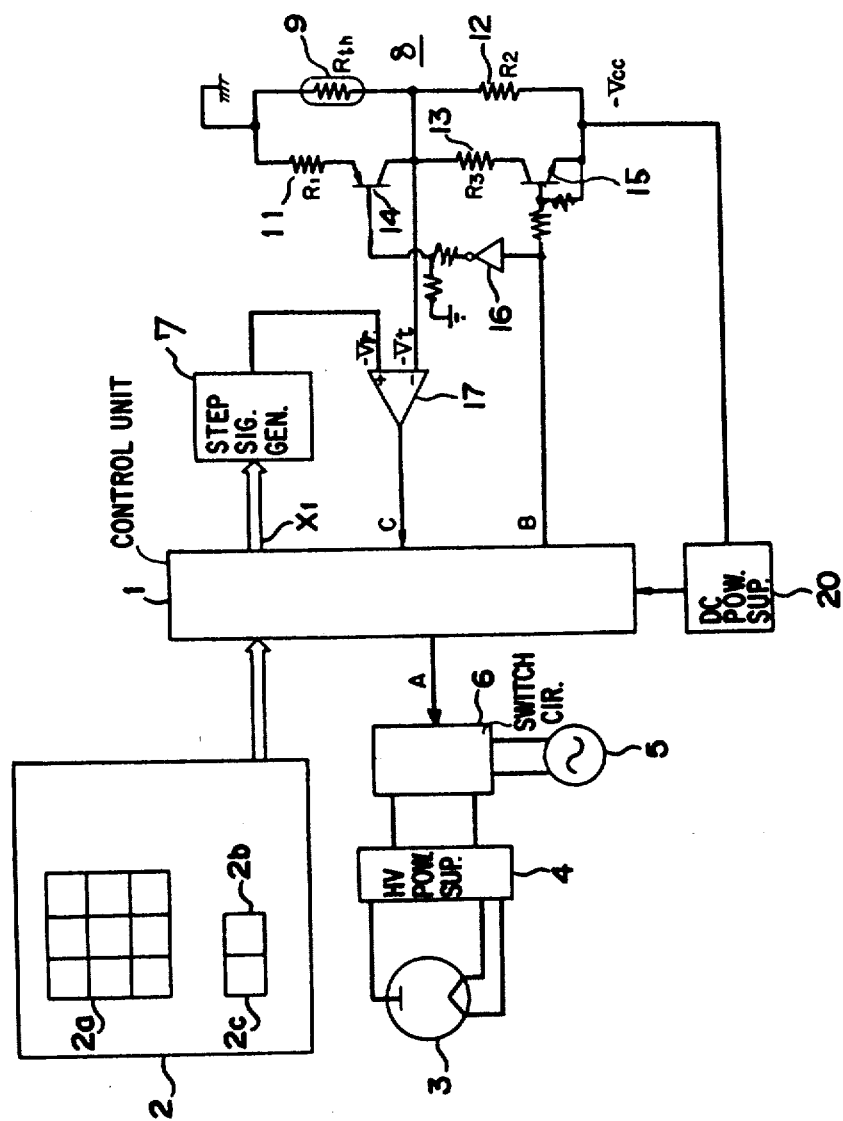
Figure 5:
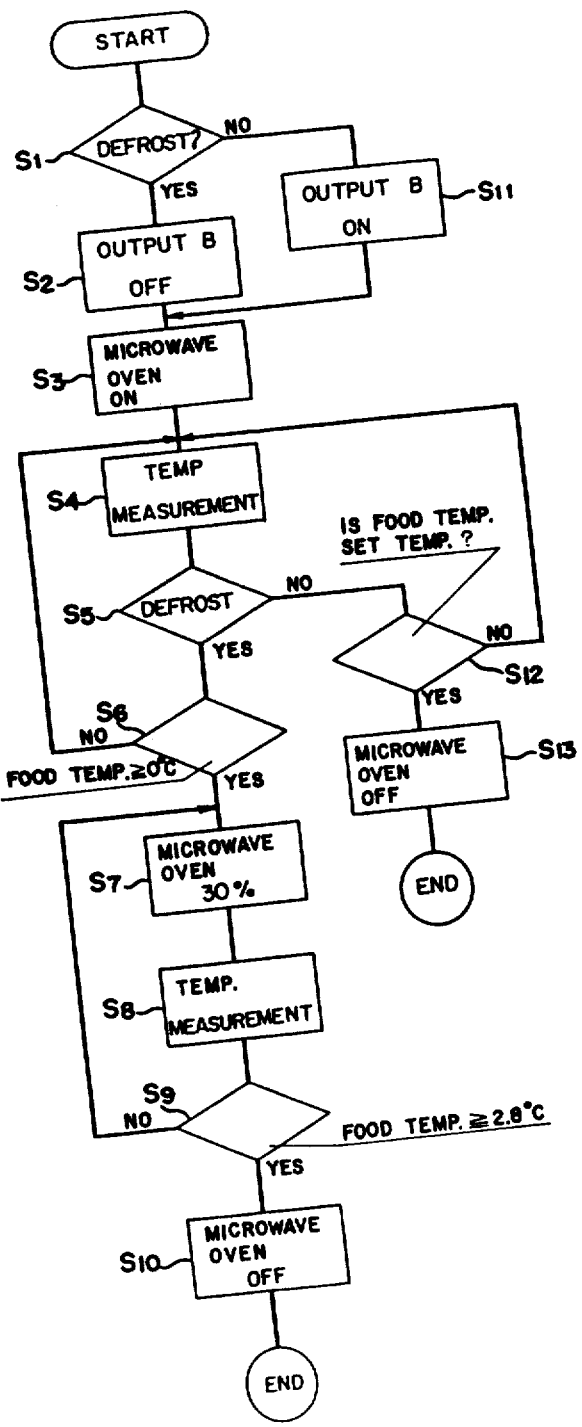

FIG. 2 is a schematic diagram showing circuit arrangement of an electric cooking oven according to the present invention, FIG. 3 is a schematic diagram showing an output wave form of a signal generating circuit employed in the circuit arrangement shown in FIG. 2, FIG. 4 is a schematic diagram showing characteristic curves of a thermistor taking both axes for sensing temperature and output voltage of the thermistor, and FIG. 5 is a flow chart showing a series of sequential orders provided in the circuit arrangement shown in FIG. 2.

Referring to FIG. 2, a control unit 1 using a micro computer is provided for controlling the microwave oven. The oven also has a magnetron 3 which is driven by the D.C. power fed from a high voltage power supply 4. The magnetron 3 produces microwave energy of any desired frequency, a frequency of 2.45 GHz. is preferred. The microwave energy produced from the magnetron 3 is fed to a food body accommodated in the oven cavity (not shown) to heat the food body in a known manner.

A key board 2 provided manually operative on the front face of the oven comprises numeric keys 2a consisting of 0 to 9 keys and various function keys including a defrost mode key 2b and a start key 2c. The output signals of each of keys in the key board 2 are fed to the control unit 1 to give various instructions such as cooking modes and cooking temperature. The high voltage supply 4 is fed an A.C. power from the commercial power source 5 through a switching circuit 6 including two way controlled rectifiers which are gated by the gate signals to supply the A.C. power in a predetermined duty cycle defined by the signal A fed from the control unit 1 so that the magnetron 3 supplies a predetermined rate of energy to the food body.

A step signal generator 7 receives the outputs of the binary coded signals of 8 bits from the control unit 1 so as to produce an output signal ($-Vr$ volts) having stepwisely changing levels of 256 (i.e., $2^8$) combinations as shown in FIG. 3. The output of the generator 7 is used for setting the cooking temperature of the food body as hereinafter explained.

A compensation circuit 8 is provided to compensate for the errors in temperature sensed by a thermistor 9 which is enclosed in a temperature sensing probe (not shown). In this embodiment, the thermistor 9 shows a resistance Rth and is manufactured to operate with the highest accuracy in the temperature range of around 100° C.

The thermistor 9 has it's one terminal grounded in common with one terminal of a first resistor 11 having a resistance value R1. The other terminal of the thermistor 9 is connected with one terminal of a second resistor 12 having a resistance value R2 with it's other terminal connected to the D.C. power source 20 having a negative potential $-Vcc$. The other terminal of the first resistor 11 is connected with one terminal of a third resistor 13 having a resistance value R3 through a first transistor 14. The other terminal of the resistor 13 is connected to the D.C. power source 20 through a second transistor 15, the base of which is connected to the control unit 1 to receive a signal B the detail of which will be described hereinafter. Also the base of the transistor 15 is connected to the base of the transistor 14 through an inverter 16.

The common junction of the thermistor 9 and the second resistor 12 and the common junction of the collector of the transistor 14 and the third resistor 13 are connected in common and being connected with one input terminal of a comparator circuit 17 having other input terminal connected with the output terminal of the step signal generator 7 so that the comparator 17 compares the output voltage $-Vr$ with the volage $-Vt$ representing the actual sensing temperature of the food body to produce a signal C at the output terminal of the comparator 17, said signal C being fed to the control unit 1.

In operation, in a case where a normal heat cooking is desired namely, for example, an operator wishes to cook a food body heating it up to a temperature of 95° C. which corresponds to the temperature range a in FIG. 1 where the thermistor 9 senses the temperature with high accuracy. The probe enclosing the thermistor 9 is attached to the food in a known manner. The following keys are operated in sequence 9 5 START then the respective signals representing 9, 5 and START are applied to the control unit 1 from the keyboard 2.

While the microwave oven operates, the control unit 1 produces a series of binary temperature reference signals of 8 bits in a parallel form from the output port X1, the contents of which change from 0 to 255 with a predetermined cycle. The binary temperature reference signals are fed to the step signal generator 7 to produce the temperature reference signal $-Vr$ of analog form the amplitude of which changes stepwisely from 0 to 255 multiple of a predetermined unit as shown in FIG. 3 with a predetermined cycle defined by the frequency of the binary temperature reference signal. The analog signal $-Vr$ is fed to one input terminal of the comparator 17.

The control unit 1 judges whether or not the defrost key 2c has been depressed in the step S1.

In this example, since no defrost key has been depressed, the control step goes to S11, thus, the control unit 1 produces the signal B of a "1" level according to the step S11. In turn, the control step goes to S3, then the control unit 1 produces a continuous "1" signal A to the switching circuit 6 to cause the two ways controlled rectifiers to be conductive. Therefore, the high voltage power supply 4 drives the magnetron 3 with 100% of full power to heat the food body.

When the control unit 1 produces signal B of "1" level according to the step S11, as mentioned above, the signal B is fed to the base of the second transistor 15 and also being fed to the base of the first transistor 14 through the inverter 16 so that both of the transistors 14 and 15 conduct resulting in parallel connection of the first resistor 11 with the thermistor 9 and the third resistor 13 with the second resistor 12. Thus, the following voltage $-Vt$ $$-V_t = \frac{-V_{cc}\frac{R_1 R_{th}}{R_1 + R_{th}}}{\frac{R_2 R_3}{R_2 + R_3} + \frac{R_1 R_{th}}{R_1 + R_{th}}} \quad (1)$$

appears across the thermistor 9, in turn voltage $-Vt$ is fed to the input of the comparator 17 as the temperature sensing signal.

The comparator 17 compares the temperature reference signal $-Vr$ with the temperature sensing signal $-Vt$ producing a high level signal c each time when the signals $-Vr$ and $-Vt$ substantially coincide each other. Therefore the output signal c is fed to the control unit 1 so that the temperature of the food body can be sensed in the control unit 1 by judging the output value of the binary temperature reference signal of 8 bits at the time when the signal c is fed to the control unit 1 i.e., when said coincidence between the signals $-Vt$ and $-Vr$ occurrs. The temperature measurment as explained above is performed in the step S4. The sensed temperature is compared in the control unit 1 with the set temperature supplied from the keyboad 2 according to the step S12. So far as the sensed temperature of the food body is lower than the set temperature i.e., 95° C. in this example, the steps S4, S5 and S12 are repeated and supply of the energy to the food body is continued from the magnetron 3.

When the sensed temperature of the food body reaches the set temperature of 95° C., namely the output signal C is fed to the control unit 1 when the binary signal representing 95° C. is appeared from the control unit 1, the output signals A and B are removed according to the step S13 to cause the switching circuit 6 off to stop the oscillation of the magnetron 3, then the cooking of the food body is completed.

In case of defrosting mode, the defrost key 2b and the start key 2c are operated. The respective signals representing the DEFROST and START are fed to the control unit 1 in which whether or not the defrosting mode is ordered is judged according to the step S1, then the output B of the control unit 1 becomes "0" according to the step S2 and the continuous output A is fed to the switching circuit 6 to drive the magnetron 3 with 100% of full power.

In this defrosting mode, since there is no output signal B, the transistors 14 and 15 are made non conductive, a series circuit consisting of the thermistor 9 and the second resistor 12 is formed for sensing the food temperature. Under such condition, the output voltage $-Vt$ across the thermistor 9 is represented by the following relation.

$$-V_t = \frac{-V_{cc}R_{th}}{R_2 + R_{th}} \quad (2)$$

The characteristic curve α in FIG. 4 represents the relation between the sensed voltage −Vt and the variation of the temperature i.e., temperature dependency of the output voltage −Vt under such state that the temperature sensing circuit consisting of the thermistor 9 and the resistor 12 in the defrosting mode. In FIG. 4, on the other hand, the characteristic curve β represents the temperature dependency of the output voltage −Vt within the temperature range below 2.8° C. under such state that the temperature sensing circuit is composed of the thermistor 9 and the respective resistors 11 to 13 as adopted in the normal cooking mode, namely the output voltage −Vt is represented by the relation (1).

In FIG. 4, the respective dotted lines depicted on the both sides of each of the characteristic curves α and β represent error range. This characteristics shown in FIG. 4 correspond those shown in the temperature range b shown in FIG. 1 and the respective temperatures b1 and b2 correspond to 0° C. and 2.8° C.

In comparing the two characteristic curves α and β the gradient or slope of the characteristic curve α is larger i.e., sharper than the gradient of the characteristic curve β. Accordingly, it is readily understood that the error range α1 which occurs on the characteristic curve α against the possible output voltage −Vt and the sensing temperature b1 (0° C.) is smaller than the error range β1 which occurs on the characteristic curve β against the same voltage value −Vt and the temperature b1.

Similarly, the error range α2 on the characteristic curve α is smaller than the error range β2 on the characteristic curve β with reference to the sensing temperature b2 (2.8° C.). Namely, error range of the sensing characteristic α is smaller than that of the characteristic curve β.

Since the output voltage −Vt across the thermistor 9 is compensated to decrease the error of the sensing temperature in the temperature range b or near the defrost temperature, the microwave oven according to the present invention can operate to defrost the food body under the desired temperature control with high accuracy using a conventional thermistor which is manufactured to operate with high accuracy in sensing temperature range in the normal cooking temperature i.e., near 100° C.

The defrost cooking operation will be explained hereinafter.

When the food temperature becomes 0° C. due to the heat energy supplied in the oven, the output voltage across the thermistor 9 becomes −Vt0. The control unit 1 senses the temperature of the food body in a similar manner as explained in the normal cooking mode, so that the control unit 1 supplies 30% output A, according to the step S7, to the high voltage power supply 6 i.e., the output A becomes a "1" for 3 seconds and "0" for 7 seconds for every cycle of ten seconds. Then the food body is heated with 30% of full power. Thereafter, when the food temperature becomes 2.8° C., the output voltage across the thermistor 9 becomes −Vt2.8 which is detected by the control unit 1 so that the output A is stopped according to the step S10 resulting in stopping the magnetron 3. Thus the defrost cooking of the food body is completed.

When the thermistor has such a characteristic that the temperature sensing accuracy is high in low temperature range such as near 0° C. and on the contrary the temperature sensing accuracy is low in high temperature range such as near 100° C. In this case the gradient of the characteristic curve of resistance of the thermistor relative to temperature may be sharpened in a high temperature range in a similar manner as described in the embodiment shown in FIG. 2.

Although the present invention has been fully described by way of example with reference to the accompanying drawings, it is to be noted that various changes and modifications are apparent to those skilled in the art. Therefore, unless otherwise such changes and modifications depart from the scope of the present invention, they should be construed as included therein.

What is claimed is:

1. An electric cooking oven comprising means for accommodating a food body to be cooked, means for heating said food body, means for detecting the temperature of said food body during the cooking thereof, said detecting means comprising a thermistor which is detachably attached to the food body to sense the temperature thereof wherein the thermistor has an output characteristic curve of resistance as a function of temperature with a first temperature range in which the error range of the resistance of the thermistor relative to the temperature is smaller than a predetermined value and a second temperature range in which the error range of the resistance of the thermistor relative to the temperature is larger than the predetermined value, an electric circuit means for converting the temperature sensed by the thermistor to an electric signal, a control means for controlling the electric power supplied to the heating means in response to the temperature signal from said circuit means to cook the food body under temperature control, instruction means for operating the thermistor in said second temperature range, and changing means for changing the characteristic curve to thereby increase the gradient of the characteristic curve of the resistance when the thermistor is operating in the second temperature range.

2. An electric cooking oven according to claim 1, wherein the temperature range in which the gradient of the characteristic curve is increased is a defrost temperature range.

3. An electric cooking oven according to claim 1, wherein the temperature range in which the gradient of the characteristic curve is increased is a high temperature range.

4. An electric cooking oven according to any one of claims 1, 2 or 3 wherein said changing means comprises resistor means connected in series with the thermistor wherein the resistance of the resistor means is changed depending on the cooking mode of the oven.

5. An electric cooking oven according to claim 4, wherein said resistor means comprises two fixed resistors connected in parallel relation through a first switching means.

6. An electric cooking oven according to claim 5, wherein said first switching means is a transistor controlled by the output of the control means.

7. An electric cooking oven according to claim 6, wherein said changing, means further comprises an additional resistor connected in parallel with the thermistor through a second switching means.

8. An electric cooking oven according to claim 7, wherein said second switching means is controlled by the output of the control means synchronized with the first switching means.

9. An electric cooking oven according to claim 8, wherein said control means comprises a comparator circuit having one input terminal connected with the thermistor, another input terminal connected to receive a temperature reference signal and an output terminal thereof connected with means for producing a signal to control said first and second swiching means.

10. An electric cooking oven according to claim 9, wherein said means for producing a signal to control said first switching means and the second switching means is responsive to the instructions from a keyboard of the oven.

11. An electric cooking oven according to claim 1, wherein said control means is operable in either a defrost mode or a normal cooking mode in response to the instructions fed thereto from said instruction means.

12. An electric cooking oven according to claim 1, wherein said heating means is a magnetron.

* * * * *

UNITED STATES PATENT AND TRADEMARK OFFICE
CERTIFICATE OF CORRECTION

PATENT NO. : 4,484,050
DATED : November 20, 1984
INVENTOR(S) : ATSUSHI HORINOUCHI ET AL It is certified that error appears in the above-identified patent and that said Letters Patent is hereby corrected as shown below:

Claim 7, line 2, after "changing" delete ",".

Signed and Sealed this

First Day of October 1985

[SEAL]

Attest:

DONALD J. QUIGG

Attesting Officer

Commissioner of Patents and Trademarks—Designate